United States Patent [19]
Frank

[11] Patent Number: 5,902,371
[45] Date of Patent: May 11, 1999

[54] MELT SHOP SCHEDULING FOR CONTINUOUS CASTING

[75] Inventor: William R. Frank, Bettendorf, Iowa

[73] Assignee: IPSCO Enterprises Inc., Wilmington, Del.

[21] Appl. No.: 08/829,532

[22] Filed: Mar. 28, 1997

Related U.S. Application Data

[63] Continuation-in-part of application No. 08/463,077, Jun. 5, 1995, abandoned, which is a continuation-in-part of application No. 08/351,693, Dec. 8, 1994, abandoned.

[51] Int. Cl.⁶ .................................................. C21C 5/52
[52] U.S. Cl. ........................ 75/10.12; 75/387; 164/452; 266/96
[58] Field of Search ................... 75/10.12, 10.16, 75/387; 164/418, 437, 488, 459, 452; 266/155, 157, 142, 901, 96; 373/78

[56] References Cited

U.S. PATENT DOCUMENTS

| | | |
|---|---|---|
| 2,355,095 | 8/1944 | Moore . |
| 3,439,909 | 4/1969 | Richards . |
| 3,612,740 | 10/1971 | Gierek . |
| 3,913,898 | 10/1975 | Wolters . |
| 4,319,921 | 3/1982 | Jensen et al. . |
| 4,460,164 | 7/1984 | Tivelius et al. . |
| 4,740,989 | 4/1988 | Steipe et al. . |
| 4,903,752 | 2/1990 | Rokop . |
| 4,978,105 | 12/1990 | Meierling . |
| 5,203,909 | 4/1993 | Petrushka et al. . |
| 5,204,873 | 4/1993 | Imagawa . |
| 5,263,690 | 11/1993 | Juenemann et al. . |
| 5,628,958 | 5/1997 | Frank ..................................... 266/143 |

*Primary Examiner*—Melvyn Andrews
*Attorney, Agent, or Firm*—Robert H. Barrigar; Barrigar & Moss

[57] ABSTRACT

In a melt shop for melting scrap to make steel, increased tonnage output for continuous casting for a given primary melt capacity can be obtained by stacking heated ladles of molten steel in inventory at a holding station before the ladles are transferred the ladle refining station or stacking refined ladles, or both, in advance of commencement of casting.

10 Claims, 5 Drawing Sheets

MELT SHOP SCHEDULING FOR CONTINUOUS CASTING

RELATED APPLICATION

This is a continuation-in-part of U.S. patent application Ser. No. 08/463,077 filed on Jun. 5, 1995 now abandoned which is a continuation-in-part of U.S. patent application Ser. No. 08/351,693 filed on Dec. 8, 1994 now abandoned.

FIELD OF INVENTION

This invention relates to a melting facility for a steel mill of the type that accepts scrap iron and steel as an input, and produces molten steel ready for continuous casting as an output. In particular, this invention relates to an industrial process for preparing molten steel comprising generating a series of superheated ladles of molten steel and retaining them in inventory before commencing continuous casting operations, and then depleting the inventory while continuing to provide fresh ladles of superheated molten steel. By proceeding in this fashion, a melt shop with limited primary melt capacity and limited ladle refining capacity, each less than the peak demand of the continuous caster, may, nevertheless, provide a sufficient supply of superheated ladles of molten steel to enable an adequately lengthy continuous casting run to occur.

BACKGROUND INFORMATION

Conventionally, a melting facility in a steel mill that accepts scrap iron and steel as an input and produces molten steel ready for casting in a continuous caster as an output (frequently referred to in the industry as a "melt shop") includes at least one and frequently two or more primary melting furnaces of the electric arc type, at least one and frequently two or more refining facility stations, and an overall excess capacity in order that a continuous supply of molten steel can be provided to the caster. If the rolling facility downstream of the caster is designed to operate with only a standard width (and thickness) of casting—in other words, if the production rate of steel output per hour is constant—then it is a fairly simple task to design a melt shop that will supply just enough steel to keep the caster fully supplied (with a slight overcapacity to provide a margin of error). However, most steel mills are required to produce cast slabs of variable widths—in a contemporary facility, typically anywhere from 4 ft. wide to 10 ft. wide or wider. This requirement presents the problem that if the melt shop is designed to supply a continuous supply of molten steel for a long sequence of casting (say) 10-ft.-wide castings, then it will necessarily have a large overcapacity when producing, say, 4-ft.-wide steel castings. This overcapacity is typically provided at the expense of a significantly higher capital outlay than would be needed if standard-width castings only were produced, and higher capital costs lead to higher steel prices.

As steel pricing becomes increasingly competitive, it is highly desirable to reduce the capital costs associated with any equipment used in the steel mill. The capital cost associated with melt shop furnaces and associated equipment is significantly high.

Capital cost also can be higher than necessary if the melt shop takes more plant room than necessary, especially if an inefficient layout requires more or larger peripheral or support equipment (exhaust arrangements, cranes, etc.) than would be necessary for a compact and efficient layout.

Associated with the primary melting furnace in melt shops of the type under discussion are scrap bucket delivery means, charging means, and ladle transfer means. The scrap bucket delivery means is conventionally a car movable along a trackway, the scrap bucket being carried on the car from a loading area external to the melt shop into the melt shop to a bucket unloading position in the vicinity of the primary melt furnace. The charging means includes an overhead hoist or crane—the bucket is then hoisted by the overhead crane and its scrap contents are dumped into the furnace to charge it. The ladle transfer means is typically a car movable along a trackway running from the tapping position underneath and proximate to the primary melting furnace to a holding position outside the primary melt area from which the ladle filled with molten steel may be conveyed by an overhead crane or other suitable conveyor to the refining facility.

Ladles are pre-heated by a gas-fired burner, at a ladle pre-heating station, before being passed to the primary melt furnace for filling.

It is conventional that after primary melting, ladles full of molten steel will be passed directly to one or more refining facility stations for metallurgical treatment and passed thereafter to the caster. The term "refining facility" is used herein to refer to what in the industry is usually called an "LMF" or "ladle metallurgical facility (furnace)". The refining facility is the secondary heating facility used for adding small amounts of metallurgical agents to a ladle of molten steel, bubbling with argon gas, and stirring, as well as heating to a desired casting or holding temperature. If two such refining facility stations are used, the caster accepts ladles first from one refining station and then the other so as to obtain a continuous supply of steel. The refining may be done in two stages at the refining facility—in a first stage, heating and argon bubbling may occur, and in a second stage, metallurgical agents may be added and the metal may be stirred to obtain uniform consistency. Normally, the electrode set is removed before the second stage begins.

Generally speaking, conventional primary scrap melting furnaces and refining facilities are each provided with a discrete electrode, or set of electrodes at least in the case of the refining facility, which latter typically operates on 3-phase alternating current.

Molten steel produced by the primary melt furnace is conventionally poured into a ladle that is then transported to the ladle finishing and refining facility. Direct current is unsuitable for use in the refining facility arrangement, because there normally cannot be a bottom electrode in a ladle. Typically, a trio of AC electrodes are used in a three-phase AC installation for providing electrical energy to the ladles in the refining facility.

To ease the refining requirement in the refining facility, it is desirable to provide a supply of alloying agents in bulk for introduction into the primary melting furnaces. This enables the primary melt to attain roughly the metallurgical composition desired for the melt. At the refining stage, trim alloys may be supplied in smaller quantities to bring the final composition of the melt to that desired.

Continuous casting cannot be carried on indefinitely—there is the necessity of shutting down the melt shop and the caster from time-to-time in dependence upon the satisfaction of a series of orders for varying quantities of product of various dimensions, and to perform maintenance and repair operations. As far as possible, however, it is desirable to be able to conduct maintenance and repair operations without any more down-time than is necessary. It is desirable to design the melt shop to be able to provide a continuous supply of molten steel to the caster for as long as required to fulfil the order at hand, or until failure of the submerged entry nozzle from the tundish into the caster mold. This may require several hours of continuous casting, and the melt shop must be able to generate the required supply.

Furthermore, energy consumption in the melt shop tends to be significantly higher than energy consumption in any other part of a steel mill. The cost of electrical energy depends not only upon the average amount of energy consumed over a period of time, but also upon the peak energy load required from time-to-time. In a typical melt shop for melting scrap, both electricity and natural gas are consumed. Electricity is consumed for the primary melting furnaces and the refining facility, and, of course, for associated blowing and pumping equipment. Natural gas is consumed to provide auxiliary heating of scrap in the primary melt furnace to provide pre-heating of ladles etc. Again, to the extent that energy expense can be reduced, the output of a steel mill can be priced competitively.

In order that a conventional melt shop be designed to match the output of the primary melting furnace(s) to the output of the ladle metallurgical refining facility, consideration has to be given to the differing lengths of time during which each type of equipment operates to perform its intended function. It will be found that the time required to perform the primary melt for a given tonnage of steel provided to fill a ladle, will exceed by a considerable margin the time required to perform the metallurgical refining, heating of the ladle contents to casting temperature, and superheating the ladle if need be. This means that there tends to be an inherent imbalance between the output of the primary melting furnaces and the refining facility that must be accommodated to permit an appropriate continuous supply of molten metal to be provided to the caster for continuous casting. One way of dealing with the imbalance is to provide a higher primary melt capacity than refining facility capacity so that the total capacity of the primary melting furnaces in tons per hour is at least approximately matched to the total capacity of the refining facility in tons per hour. This approach to melt shop design is satisfactory from the point of view of balancing the output of both the primary furnaces and refining facility, but if widely differing slab widths must be produced in the mill, the excess capacity either in the number of furnaces or in the designed tonnage capacity of furnaces adds significantly to the capital cost of constructing the melt shop.

SUMMARY OF THE INVENTION

According to the present invention, in a melt shop for a steel mill, at least two primary melting furnaces (here meaning at least two refractory shells for melting charges of solid metal, typically scrap metal) and at least two refining facility stations are provided. For most installations it is expected that each of the primary melting furnaces should preferably be a DC melt furnace provided with a single consumable graphite electrode, but for various reasons some designers may prefer to provide an AC primary melt furnace instead of a DC primary melt furnace. The principles of the present invention may be applied regardless of the choice of AC or DC for the primary melt furnace.

At least two refining facility stations located downstream of the primary melting furnaces complement the two primary melting furnaces. (In this specification, the terms "upstream" and "downstream" are used relative to the sequence of process steps, so that scrap input to the primary melting furnaces is the most upstream event, and delivery of molten steel to the tundish at the caster is the most downstream event in the melt shop. Equipment should preferably be located so that the required sequence of process steps occurs within the least distance conveniently possible, which implies that equipment should be arrayed in orderly fashion from upstream to downstream to minimize transit, etc.)

It is an objective of the present invention to avoid excess energy expense, especially electrical energy expense, and to that end it is proposed according to the invention to avoid energizing (by electricity) more than one primary melt furnace nor more than one refining facility (in a minimum installation) at any given time. By operating the furnaces in this way, peak electrical loading is reduced. However, to achieve this objective, proper coordination of the melting, refining, and casting operations is required, as will be discussed below.

According to the invention, notwithstanding the fact that the time required to perform the primary melt of a given tonnage of steel to fill a ladle is substantially higher than the time required to refine a ladle full of the same tonnage of molten steel and heat it to casting temperature (which imbalance between refining capacity and primary melt capacity must be suitably redressed), nevertheless, in a minimum installation according to the invention, two primary melting furnaces (shells) of a given tonnage capacity and only two refining facility stations of approximately the same tonnage capacity as the primary melting furnaces are provided. The total furnace output capacity in tons per hour when only one primary melt furnace at a time is electrically energized is designed to be well below maximum refining and casting capacity at maximum slab widths, thereby to reduce the capital cost of the primary melting furnaces. Continuous casting is made possible even for design maximum slab widths by setting aside a stock of ladles full of molten steel before casting begins. Preferably most of the stock of ladles of molten steel is a stock from the primary melt furnace not yet subjected to refining. However, at least one, and possibly more, of the ladles of molten steel must be subjected to refining prior to commencing casting if casting is to be continuous.

These ladles set aside may be kept at a holding station and then transferred to the refining facility or to the caster, as the case may be. Preferably the stock of ladles will have been superheated so that when they proceed to the next step in the operating sequence, they will continue to the molten at an adequately high temperature. Alternatively, means may be provided before pouring to raise the temperature of steel in the ladles to a temperature satisfactory for casting. When a sufficient inventory of full ladles of molten steel have been set aside so that a series of full ladles can then be provided for continuous casting over (say) an 8-hour casting cycle, and at least one refined ladle at or above minimum casting temperature is immediately available, casting can begin.

After the initial stocking of ladles of molten steel, because the primary melt furnace is continuing to supply fresh ladles of molten steel, albeit at a slower rate than the rate at which the refining facility can complete the refining and final heating of the ladles, nevertheless, within the design capacity of the melt shop, only a small inventory of ladles of molten steel need be set aside before casting can commence—possibly only on ladle if the mill is set up to produce minimum-width castings throughout the designed casting cycle (say 8 hours), or as few as about two to five ladles for casting slabs of higher than minimum width. Of course, if the time required to supply a given quantity of refined molten steel exceeds both the time required to melt such quantity of steel and the time required to refine such quantity of steel, this invention has no application.

At the beginning of an initial melting period proceeding a casting cycle, the refining facility stations may remain idle while the primary melting furnaces build up any required inventory of ladles of molten steel. However, for an initial refining time beginning after the initial melting time has started and continuing to the end of the initial melting time, the refining facility stations refine one or more ladles of molten steel in the required inventory of ladles of molten steel in order to ensure that the caster can be continuously supplied with refined molten steel. It is generally preferred that most of the inventory of ladles of molten steel be held in readiness downstream of the ladle metallurgical facility. Whatever inventory of ladles of molten steel exist will be depleted to zero during the casting cycle, while the primary melting furnaces and ladle metallurgical facility continue to provide fresh ladles of molten steel. From that point on, typically near the end of the casting cycle, ladles from the primary melting furnaces can be sent direct to the refining facility stations when they are ready to be processed in the refining facility stations. Because at the beginning of the casting cycle for the wider slabs, the primary melting furnaces cannot keep pace with the production of the refining facility stations, the refining facility stations can, to supplement the supply of fresh ladles from the primary melt furnace, heat and treat ladles full of molten steel that have been previously set aside at a holding station between the primary melt furnaces and the ladle metallurgical facility. By suitably coordinating the sequence of primary melts, refining and holding steps, continuous casting can be arranged for about 8 to 16 heats (say) without interruption, with a maximum inventory of no more than about 4 to 6 ladles of molten steel, of which at most 2 ladles have been refined, for an appropriately designed melt shop capacity.

Typically, it is necessary for the mill manager to interrupt the casting operation after satisfying the order being processed, or to replace the tundish nozzle, or to replace refractories eroded, etc. Consequently, the described mode of operation is satisfactory.

The result is that for a relatively low capital cost, a continuous casting facility can be built that will provide, with proper management and using ladles carrying a suitable design tonnage (say, 150 tons) of molten steel, an annual production capacity from a continuous casting operation of approximately one million tons of finished steel per year, at competitive pricing, with a cast slab width design ratio of about 2.5 to 1 (being the ratio of maximum design slab width to minimum design slab width—say, 10' to 4').

For simplicity, the above summary has been based on the assumption that various parameters, such as the time required to melt, refine and cast a given quantity of steel, are known in advance and do not change. In fact, it will be appreciated by those skilled in manufacturing steel that none of these times are known precisely beforehand. Instead, these times are estimated, and these estimates frequently change as more information is received from the melting furnaces, refining stations and caster over the production run. As these estimates change to better reflect their true values, the scheduling method of the invention takes into account the revisions to these estimates in determining the inventory amounts of molten steel and refined molten steel.

According to one aspect of the invention there is provided a scheduling method for implementing in a method of producing a quantity of steel for a continuous production run of a continuous caster. The continuous caster receives refined molten steel from a refining facility that in turn receives molten steel from a primary melt facility. The scheduling method applies where the rate of consumption of refined molten steel by the caster exceeds the rate of production of refined molten steel. In the method of producing the quantity of steel, the quantity of refined molten steel is supplied to a caster over a supply time, which commences at a supply starting point. The quantity of steel is melted over a total melt time comprising an initial melt time, which precedes the supply starting point, and a later melt time, which follows the supply starting point. The quantity of molten steel is refined over a total refining time comprising an initial refining time and a later refining time. The initial refining time commences at a refining starting point after commencement of the initial melt time when molten steel is available for refining. The initial refining time ends at the supply starting point, at which time the later refining time commences. The improvement of the invention includes determining a plurality of independent control variables including a total melt time estimate, which is an estimate of the length of the total melt time required for the production run; a total refining time estimate which is an estimate of the length of the total refining time required for the production run; and, a supply time estimate, which is an estimate of the length of the supply time required for the production run. These independent control variables are revisable at selected monitoring times during the initial melt time based on the monitored values of at least one selected monitored parameter representing selected steel mill conditions existing at the selected monitoring times. Based on the control variables, an initial melt time estimate is determined. The initial melt time estimate is a length of time for the initial melt time that is sufficient for the caster to be continually supplied throughout the supply time with steel melted during the total melt time. Steel is melted, and the initial melt time estimate is revised during the initial melt time in response to revisions made at the selected monitoring times to the supply time estimate, the primary melt time estimate and the total refining time estimate. Based on the control variables, an initial refining time estimate is generated. The initial refining time estimate is a length of time for the initial melting time that is sufficient for the caster to be continually supplied throughout the supply time with molten steel refined during the total refining time. Refining of the molten steel starts at the refining starting point after melting has started and sufficient molten steel is available for refining. The initial refining time estimate is revised during the initial refining time in response to revisions made at the selected monitoring times to the supply time estimate, the primary melt time estimate and the total refining time estimate. Casting commences at an earliest casting starting point when (1) the initial melting time estimate is less than the length of time elapsed since commencement of the initial melt time, and (2) the initial refining time estimate is less than the length of time spent refining since the refining starting point.

The invention can be used in conjunction with other melt shop features described herein with the objective not only to reduce the capital cost of the melt shop as described but also to reduce operating expenses, particularly energy costs, by suitably designing and selecting both the plant layout and the energy-consuming equipment to be used in the melt shop.

The above description is of a minimum installation according to the invention. Obviously what has been described with reference to a pair of twinned primary melting furnaces and a pair of twinned refining facility stations could be doubled (say) to achieve comparable results on a larger scale.

THE DRAWINGS

DETAILED DESCRIPTION WITH REFERENCE TO THE DRAWINGS

For convenience, the following description covers not only the present invention but also inventions described and claimed in parent U.S. patent application Ser. No. 08/463,077 and U.S. patent application Ser. No. 08/351,693.

Figure 1:
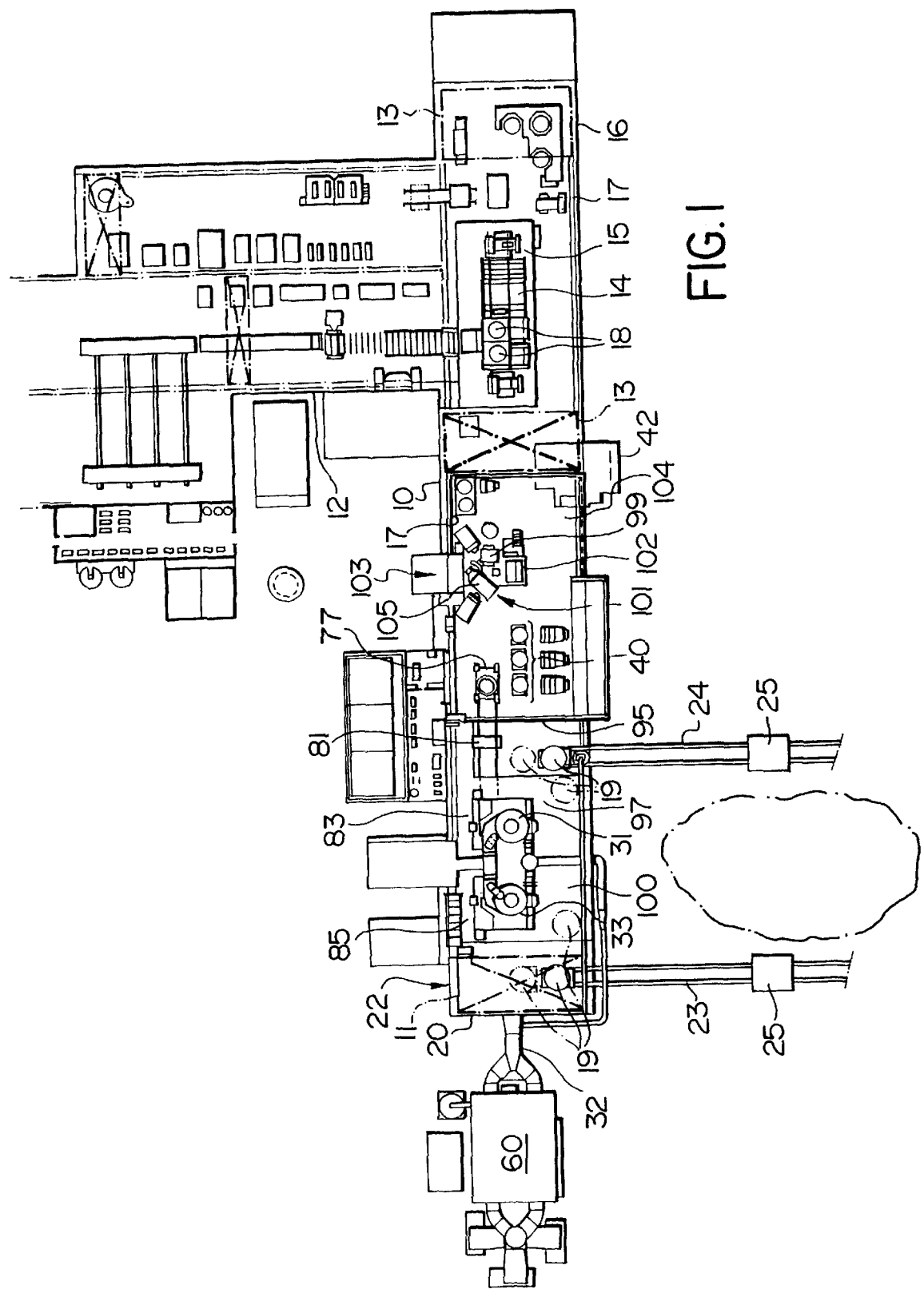
FIG. 1 is a schematic plan view of a melt shop layout suitable for supporting a preferred method of preparing and scheduling ladles of molten steel in accordance with the principles of the present invention.
Figure 2:
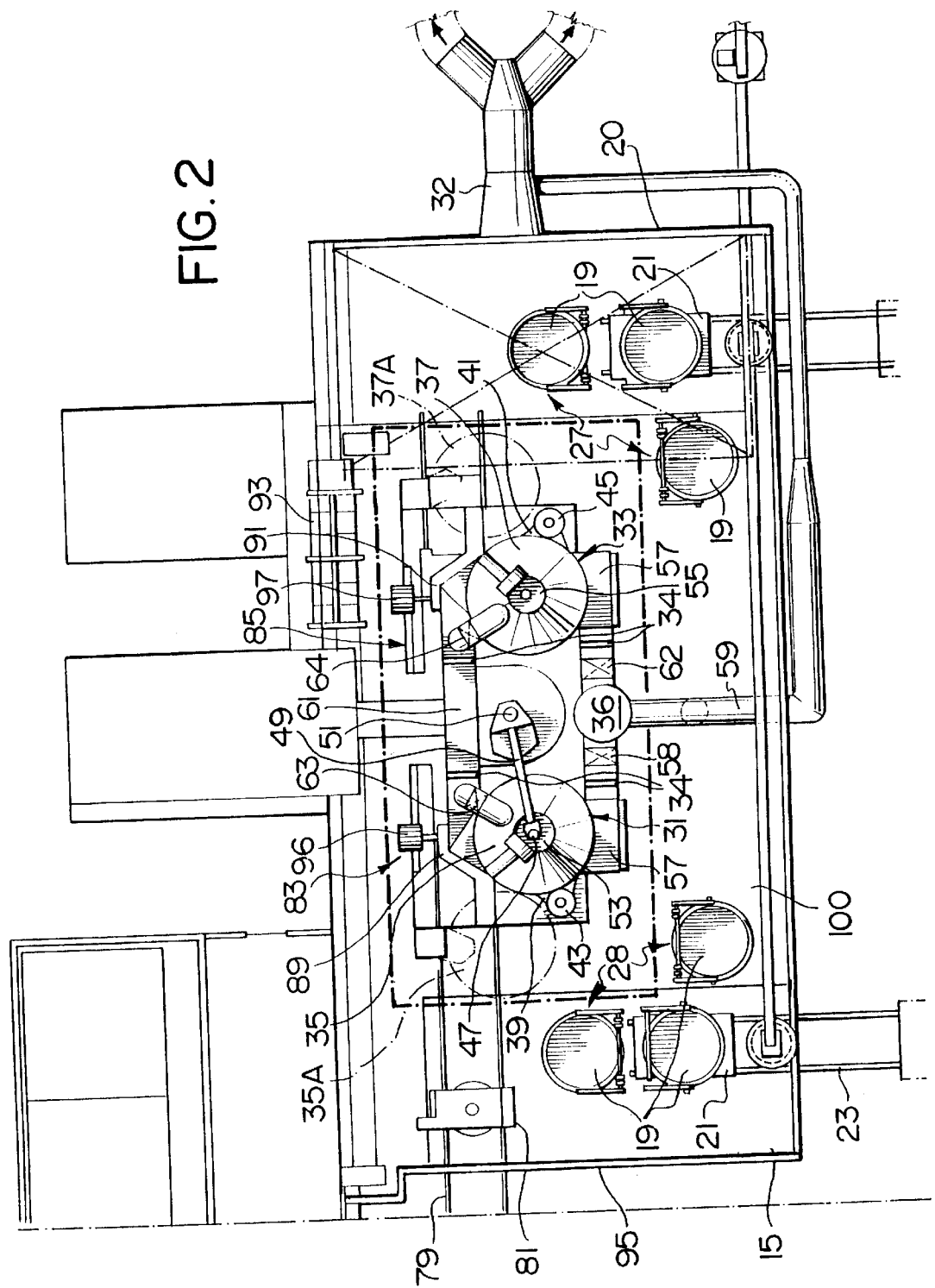
FIG. 2 is a schematic plan view of a mirror image of the primary melt facility forming part of the melt shop of FIG. 1.

The melt shop generally indicated as 10 illustrated in FIG. 1 comprises an elevated primary melt area 100 installed generally on one horizontal level of a steel mill. The primary melt area 100 is shown in more detail in FIG. 2, in the mirror image of the area illustrated in FIG. 1. Obviously the left-right orientation of the items of equipment illustrated in FIG. 1 is arbitrary; the orientation could have equally well been reversed, as FIG. 2 illustrates. Immediately beside the primary melt area 100 and atmospherically isolated therefrom (except for human passage and the passage of ladle transfer cars) by a barrier wall 95 and at a lower horizontal level (typically ground level) is a refining area 102 and, at the same level as refining area 102 (or conceivably at a still lower level), a ladle operations area 104; these last two areas are shown together in more detail in FIG. 3.

Near the downstream end 16 of the ladle operations area 104 a caster 14 is located on elevated caster platform 15; the tundish (not shown) for the caster 14 would be located immediately underneath the two ladle pouring stations 18 located above the melt shop floor level and shown adjacent the caster 14. A caster runout building 12 adjoins the melt shop 10 at a lower level with a longitudinal orientation generally transverse to the longitudinal orientation of the melt shop 10.

The melt shop 10 is shown as having a single-aisle longitudinal extension from its upstream end 20 to its downstream end 16. At the upstream end, a pair of longitudinally spaced scrap bucket trackways 23, 24 supply scrap steel to the melt shop from a location external to the melt shop. The scrap bucket delivery may be at a level selected to be suitable from both an interior and exterior point of view relative to the melt shop, but would normally be expected to be at ground or pit level (the lowest level of location of equipment and operations).

The melt shop is provided with a pair of travelling overhead cranes 11, 13 (schematically identified by broken-line rectangles with broken-line diagonals, the crane 13 being shown in two of its various possible positions) that are able to travel longitudinally along a single common pair of transversely spaced rails 17 longitudinally extending along the melt shop at pit level. Preferably the equipment layout within the melt shop is arranged to be accessible to either of the travelling cranes 11, 13 so that no additional cranes are required within the melt shop. Further, the location of the caster 14 in alignment with the main equipment in the melt shop 10 and within the service area of the cranes 11, 13 enables the crane 11 or 13 to service the caster 14 as well as equipment within the melt shop. Either crane 11, 13 is capable of performing any of the tasks assigned to a hoist or crane, but typically the crane 11 is used to charge primary melting furnaces 31, 33 with scrap, whilst crane 13 works primarily with ladles downstream of the primary melt area.

Scrap buckets 19 are removably carried on carriages 21 movable along trackways 23, 24 to carry scrap metal from an external scrapyard 25 to interior upstream and downstream charging positions 27, 28 that may also serve as pre-charging holding positions. The crane 11 hoists a scrap bucket 19 full of scrap off its associated car 21 and moves it to a precharging holding position 27, 28 near one of the arc furnaces 31, 33 from whence it can be moved over and its scrap content dumped into the primary melt furnace (31 or 33) scheduled next in sequence to receive a charge.

The primary melting furnaces 31, 33 are two in numbers in a minimum installation. Each of the furnaces 31, 33 is provided with a removable roof, that for furnace 31 being shown in closed position by reference numeral 35, and in open position in phantom as 35A. The roof 37 for furnace 33 is shown in closed position, and in open position in phantom as 37A. It will be seen that the opening and closing of these roofs is made possible by means of the pivoting of support arms 39, 41 respectively, about a supporting mast (43, 45 respectively) so that the roofs for the furnaces can pivot between open and closed positions.

A consumable electrode 47 is vertically oriented and mounted on electrode support gantry 49 that is pivotally mounted for horizontal pivotal movement on a support mast 51 positioned equidistantly between the furnaces 31, 33. The pivoting arrangement enables the electrode 47 to be pivoted away from furnace 31 (the position that it occupies as illustrated in FIG. 1), so that it may be selectably inserted instead into furnace 33. Roof apertures 53, 55 are provided in roofs 35, 37 respectively to enable the electrode to penetrate into the furnace interior to melt a charge of scrap within the furnace into which it penetrates. A conventional mechanism (not shown) can raise and lower the electrode 47 as required to permit it to be advanced into the scrap as the electrode is consumed, and to permit it to be retracted so that the support arm 49 can toggle the electrode 47 from one furnace to the other. Such means of moving the electrode vertically may be of conventional design and is not per se part of the present invention.

While a single DC electrode 47 has been illustrated, it is to be understood that, if desired, AC primary melting could instead be devised, in which case a trio of AC electrodes operating with a three-phase AC supply could be substituted for the single DC electrode 47 illustrated.

After melting, the steel obtained from a charge occupies only a fraction (typical about ⅕th) of the volume of the charge of scrap required to produce the molten steel. Consequently, more than one charge (typically two charges) are required in succession to be melted before there is enough molten steel available within either of the primary furnaces 31, 33 to fill a ladle when tapped. The charging/ melting sequence, therefore, is to position electrode 47 first (say) within furnace 31 whose charge of scrap is then melted. In the meantime, the roof 37 of furnace 33 is opened to permit the overhead crane 11 to charge furnace 33 with a fresh charge of scrap to be melted. For this purpose a scrap bucket 19 is removed from its support carriage 21 and then hoisted by the crane 11 in position over the furnace 33. Then the bottom of the scrap bucket 19 is opened to permit the charge to fall into the furnace 33. The roof 37 is then replaced in position over the furnace 33 (assuming that one bucket of scrap is sufficient to fill the furnace) and that furnace remains idle until the charge of scrap in furnace 31 has been melted. When the charge within furnace 31 has been melted, the electrode 47 is transferred for operation to furnace 33, and melting of scrap begins in the furnace 33. In the meantime, a second charge of scrap metal can be added to furnace 31. After the charge in furnace 33 has been melted, the electrode 47 is re-transferred to furnace 31 and the remaining charge in furnace 31 melted, at which time, according to the design capacity of the furnace, enough molten steel is present within the furnace 31 that the furnace can be tapped and a ladle can be filled. After a ladle has been filled, the furnace 31 is recharged with a fresh load of scrap, and the cycle repeats.

The barrier wall 95 together with the adjoining walls surrounding the primary melt area (generally indicted as 22 in FIG. 1) form an enclosure (indicated schematically as 111 in FIG. 5) from which airborne effluent gases (offgases) are drawn by means of an exhaust hood 113 and collector duct 32 of conventional design to baghouse 60 located exterior to the upstream end 20 of the melt shop 10. Additional exhaust ductwork represented (FIG. 5) by fragmentary duct 117 and additional exhaust fans, etc. (not shown) may be provided as desired. The primary melt area 100 is thus closed off by the walls 22 and 95 so as to contain the melt shop atmosphere. Barrier wall 95 should preferably be a movable partition that can be opened to permit either of the overhead cranes 11, 13 (and their cargo) to pass between the primary melt area 100 and the ladle operations area 104.

Figure 5:
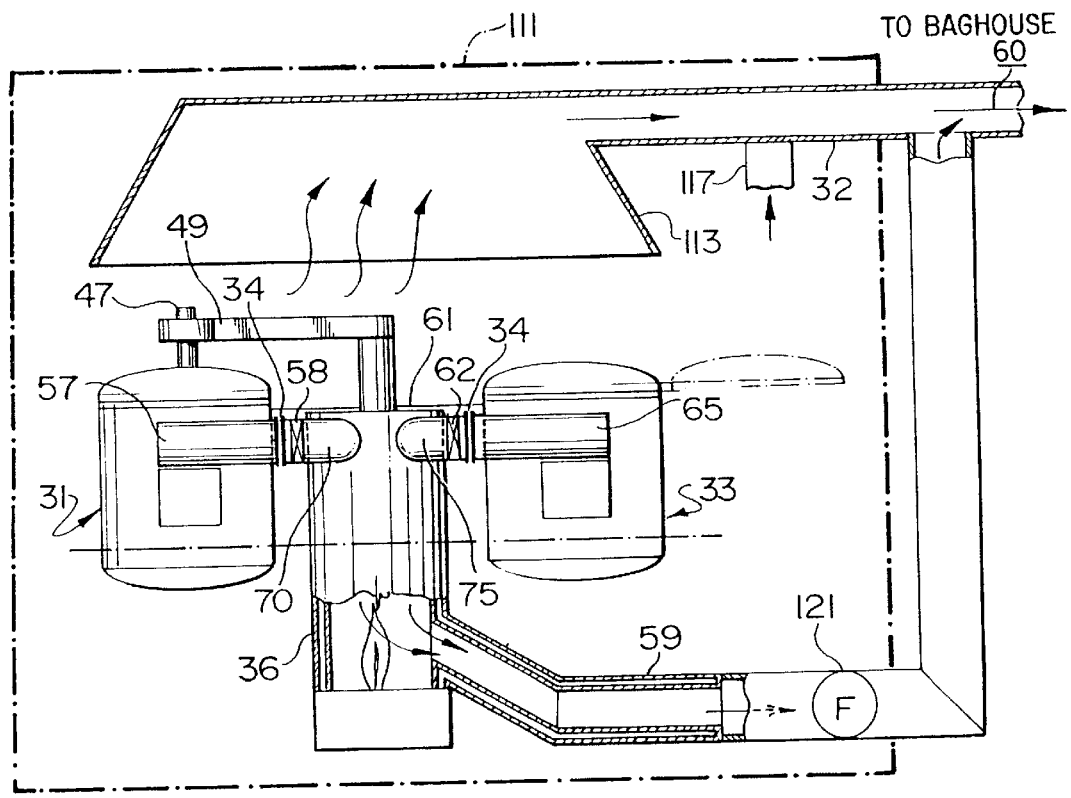
FIG. 5 is a schematic side elevation view of the offgas ducting and valve control for each of the primary melting furnaces of FIG. 2.

Each of the furnaces 31, 33 is provided with an exhaust offgas duct or manifold 57 leading via an associated collector duct 70, 75 respectively to afterburner or combustion chamber 36 (see FIG. 5). Within the ducts 70, 75 are damper valves 58, 62 respectively each operable to open or close the connection between the associated manifold 57, 65 and the associated collector duct 70, 75 leading to a combustion chamber 36. Further combustion of the offgas occurs in combustion chamber 36, resulting in a cleaner effluent therefrom, which effluent is directed via exhaust duct 59 assisted by fan 121 and thence to baghouse 60 for the collection of any remaining dust and debris. Note that the combustion chamber 36 may be supplied with a gas flame to ignite any combustible gases remaining in the offgas, of which carbon monoxide is likely to be the most prevalent combustible gas. This serves to eliminate or at least minimize the risk of an explosion in the baghouse 60. More than one such combustion chamber may be provided if desired. If it is found that there is a lot of combustible matter in the offgas, the combustion within combustion chamber(s) 36 could be used to provide auxiliary heat for use elsewhere, for example in additional preheating of the scrap in an optional preheat chamber (not shown) prior to its introduction into one of the primary melting furnaces, or to make steam.

Figure 4:
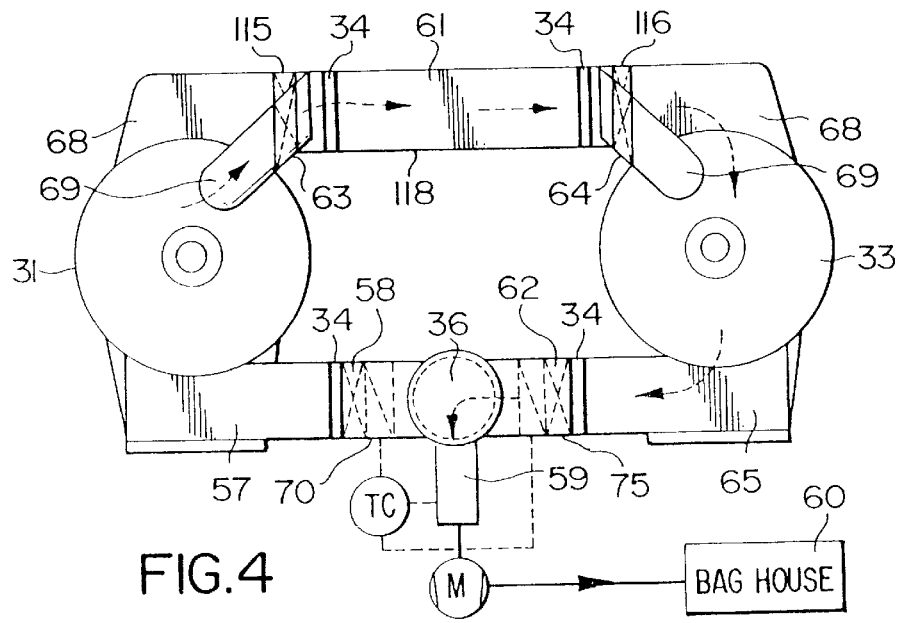
FIG. 4 is a schematic diagram of the offgas ducting and valve control therefor, for the primary melting furnaces of FIG. 2.
Figure 6:
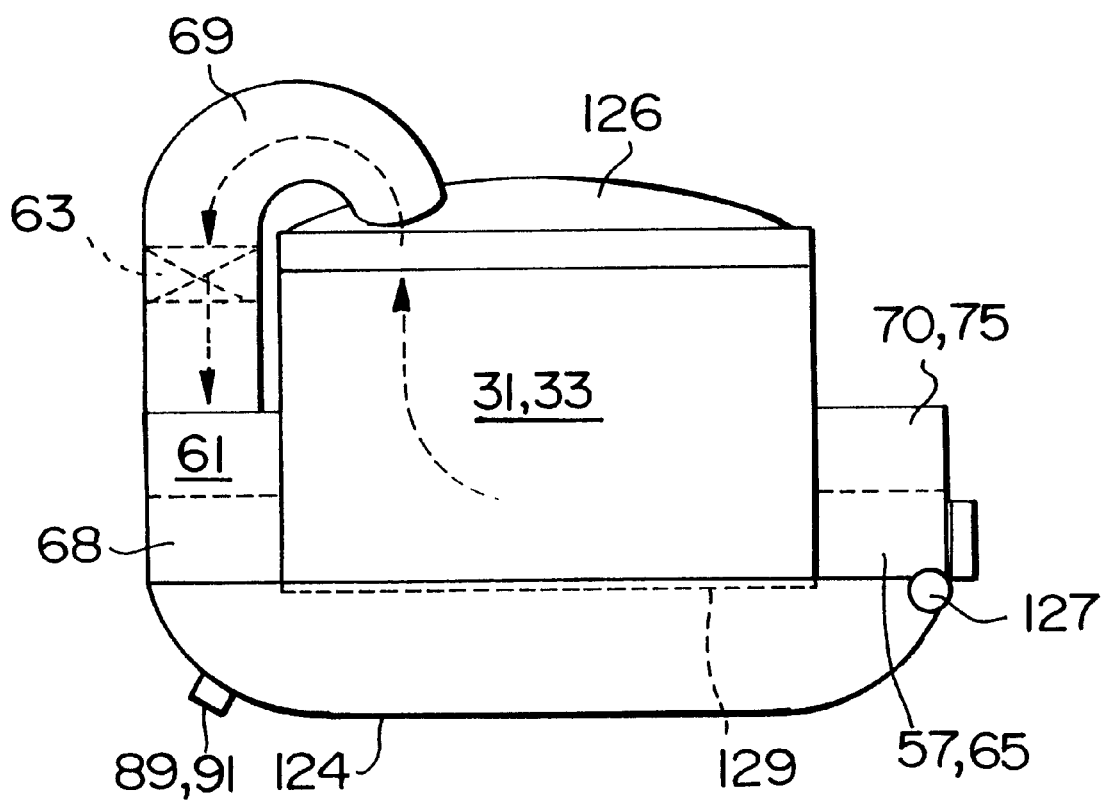
FIG. 6 is a schematic end elevation view of one of the primary melt furnaces of the melt shop of FIGS. 1 and 2, showing schematically the associated offgas ductwork.

Between furnaces 31 and 33 there is an offgas transfer duct 61; see FIG. 4. The transfer duct 61 comprises a central fixed duct 118 separated by break flanges 34 from end manifolds 68 directly coupled to and moving with their respective associated furnaces 31, 33. Damper valves 115, 116 at the ends of manifolds 68 in the vicinity of break flanges 34 are operable to open or close the manifolds 68 to the central duct 118. Note that the manifolds 68 are located toward the bottoms 124 of their respective furnaces 31, 33 (see FIG. 6). From the tops 126 of each of the furnaces 31, 33, an offgas collector elbow duct 69 leads via an associated damper valve 63, 64 to the transfer duct 61. Damper valves 63, 64 are operable to open or close elbow ducts 69 to transfer duct 61. Additional booster fans (only one exemplary fan 121 is shown) may be provided for efficient offgas flow.

At the beginning of the operating cycle of the furnaces, the furnace 31 (say) is charged with scrap, the cover 35 (FIG. 1) replaced atop the furnace 31, the electrode 47 (FIG. 1) inserted into the scrap charge, and electric current applied, whereupon melting of the scrap charge in furnace 31 begins. At that time, dampers 62, 63, 64, 115 and 116 are closed and damper 58 is open so that the only exhaust available from furnace 31 is via manifold 57 and duct 70. Once the idle furnace 33 is charged with scrap and its cover 37 (FIG. 2) repositioned over the furnace 33, dampers 115 and 64 and consequently transfer duct 61 are opened. Damper 62 is now opened to permit offgas to exit via exhaust duct 75, while exhaust duct 70 is closed by means of damper 58, so that the offgas from furnace 31 is directed through the charge of scrap in furnace 33, and thence to exhaust duct 75 that is open to pass the offgas to combustion chamber 36, thence to collector duct 59, and thence to the bag house 60.

As offgas passes from the transfer duct 61 into the interior of furnace 33, the velocity of the offgas drops off quickly because of the large volume available to its passage through furnace 33, as compared to the volume of the duct 61, and, consequently, dust and debris have an opportunity to settle out within the furnace 33. Further, the charge of scrap within the furnace 33 serves as a filter or collector for dust and debris, and also tends to remove dust and debris from the offgas. The offgas, less a substantial portion of the dust and debris that it originally carried, then passes via manifold 65, duct 75, combustion chamber 36, and dust 59 to the bag house 60. This mode of operation reduces the amount of dust and debris sent to the bag house and, therefore, increases the time interval required for emptying the bag house, thereby lowering the operating costs. Further, some of the dust and debris that settles within the furnace 33 comprises iron and alloying materials and, consequently, constitutes a useful addition to the melt within furnace 33 when melting begins in that furnace. Further, the charge of scrap within furnace 33 is pre-heated by the passage of the offgas from furnace 31 through the charge of scrap within furnace 33, thereby reducing the energy requirement for melting the scrap within furnace 33.

The above cycle is repeated in mirror image for the scrap melting cycle of furnace 33. While furnace 31 is charged with a second load of scrap, offgas from furnace 33 (now actively melting its charge of scrap) flows only via exhaust duct 75, combustion chamber 36 and collector duct 59 to the baghouse 60. After furnace 31 is fully charged, awaiting its turn to resume melting, exhaust duct 75 and common transfer duct 61 are reopened and exhaust duct 128 closed so that the offgas from furnace 33 is forced to pass through the fresh charge of scrap in furnace 31. This requires that damper valves 58, 64 and 115 be open while damper valves 62, 63 and 116 are closed.

All of the offgas ducts and manifolds in the vicinity of the furnaces are water-cooled to prevent excessive temperatures from building up and to permit the gases to cool to a temperature at which normal ducting (not water-cooled) can be safely used. Normally the offgas is mixed downstream with ambient air before entering the baghouse 60.

The various damper valves 58, 62, 63, 64, 115, 116 are desirably located close to the furnace, rather than removed from the furnaces, so that dust and debris have little tendency to settle within the ducts 61, 70, 75 when a given damper is closed. All of the damper valves 58, 62, 63, 64, 115 and 116 are water-cooled; they may be of conventional design. Break flanges 34 are arranged at suitable locations along the various ducts to enable the furnaces 31, 33 to tilt (pivot) when tapped without fracturing the ducts. Note also that the furnace shells are pivotally openable about pivot 127 (FIG. 6) along break line 129.

Desirably, the manifolds 68 are located at a relatively low level to permit transferred offgas to preheat a charge of scrap more efficiently than would be possible if these manifolds were located higher up in each furnace. However, the connecting elbows 69 are preferably coupled to furnaces 31, 33 respectively at or near the tops of the furnaces so that as much dust and debris as possible may settle out before the offgas is exhausted via one of these elbows. Note that the manifold 68 is located generally opposite the location of manifold 57, 65 within an associated furnace 31, 33. The location of the manifold 57, 65 generally opposite the transfer manifold 68 facilitates the settling of incoming dust and debris out of the incoming transferred offgas and onto the furnace floor.

A potential disadvantage of the foregoing arrangement is that gases and dust en route to combustion chamber 36 are cooled by passage through the idle furnace before reaching combustion chamber 36. This cooling may result in incomplete combustion in chamber 36, increasing the risk of environmental contamination by effluent gases passing out of the baghouse 60. To so extent, the problem can be circumvented by separately preheating the idle furnace during the first few minutes of passage there through of the gas from the active furnace, but this diminishes the benefit of using the foregoing offgas preheating arrangement. If environmental regulations are particularly strict, it may not be possible to use the offgas preheating proposal herein described.

Ladles 71 are shown in a stacking or holding area 40 (FIGS. 2 and 3) while awaiting pre-heating and filling. A trio of ladles 71 are shown at a ladle slide gate repair and pre-heating station 73. Typically, ladles during slide gate repair and pre-heating are placed on their sides, and are given any necessary repairs prior to pre-heating. The slide gate (not shown, of conventional design) that controls the flow of metal out of the ladle and into the tundish for casting, is that part of the ladle that tends to need the most maintenance, and frequently requires repair prior to pre-heating of the ladle. Once in proper repair, ladles may be pre-heated by suitable gas burners or the like in readiness for filling.

Ladles 71 are moved from position to position by means of overhead crane 13. Just prior to filling, an individual preheated ladle 71 is placed by the crane 13 on a ladle car 77 movable along a trackway 79 that leads from a rest or holding position 72 to a final pre-heat station 81 immediately prior to tapping the primary melt furnace. At the pre-heat station 81, sand is poured over the slide gate port of the ladle 71 (not shown, of conventional design) to prevent steel from freezing in the vicinity of the ladle outlet port. The carriage 77 is then moved along track 79 to a position 83 or 85 (depending upon which of the furnaces 31, 33 is ready for tapping) and the furnace is emptied via its outlet port 89 or 91, as the case may be.

Figure 3:
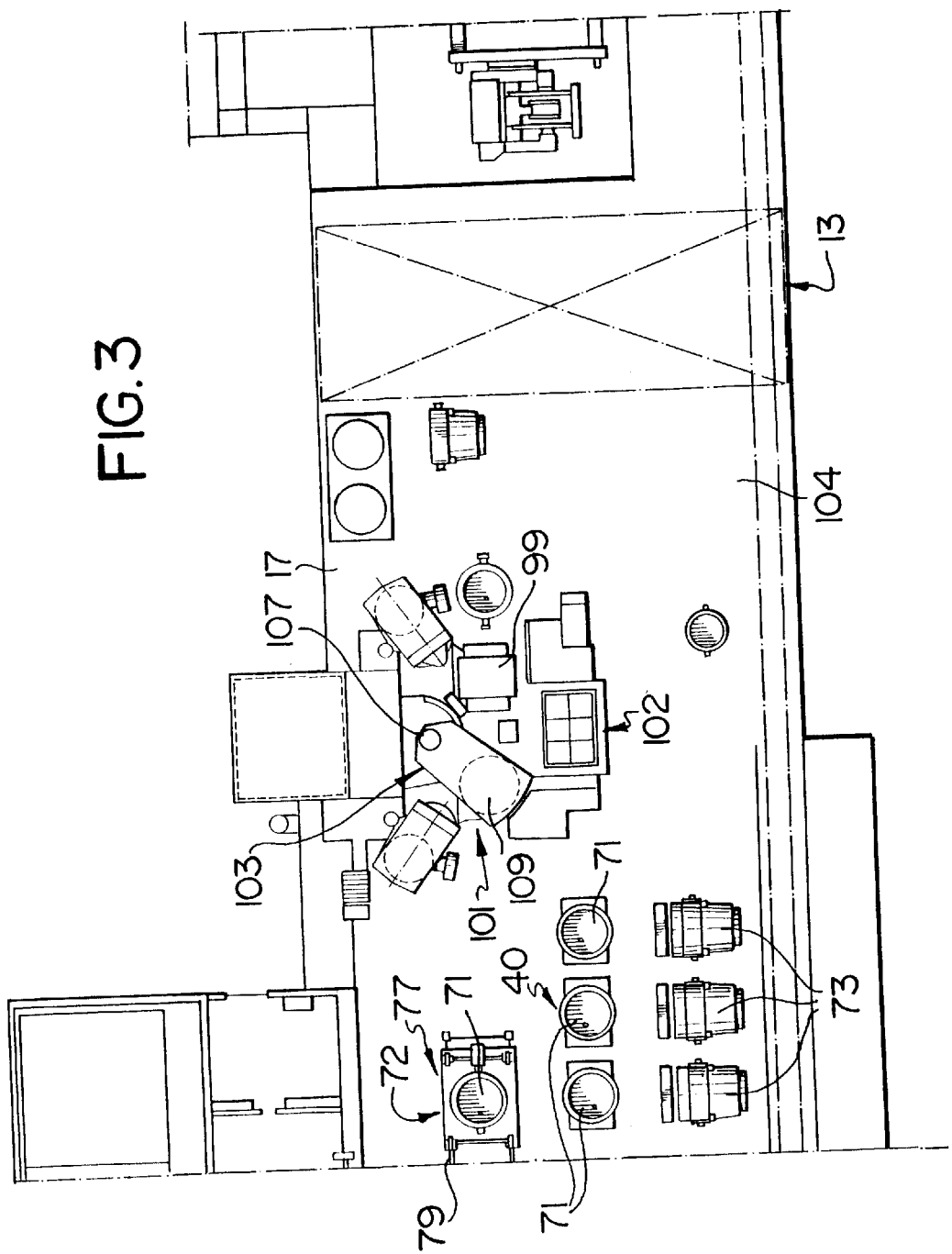
FIG. 3 is a schematic plan view of the refining and ladles facility forming part of the melt shop of FIG. 1.

Alloying agents in quantity may be added directly to furnaces 31, 33 using a suitable loading vehicle (not shown) that obtains quantities of alloy from alloy bunkers 93. Alloy may also be added to the ladle being filled via bulk additive chutes 96, 97 (as the case may be) each of which is pivotal about a vertical axis to swing over or away from a ladle being filled by the furnace, so that alloys may be added directly to the ladle.

once a ladle 71 has been filled, it is removed from its position underneath the melt furnace outlet, and reassumes rest position 72 in the vicinity of the right-hand end of track 79 as seen in the drawings. At that point, the crane 13 may hoist the ladle 71 directly to ladle position 99 or 101, these being the two ladle positions within a ladle metallurgical refining facility generally indicated as 103 (FIG. 3). Alternatively, a freshly filled ladle may be temporarily stored in a heated holding or stacking area 40 (FIGS. 2 and 3), if both positions 99 and 101 are occupied, or if it is desired to build up an inventory of filled ladles before commencing metallurgical refining in refining facility 103.

Refining facility 103 is shown as including a pivotally mounted electrode support arm 105 that pivots about a support mast 107. Electrode support arm 105 supports a trio 109 of AC electrodes removably immersed in a ladle of molten steel and through which three-phase alternating current flows for further heating of the contents of the ladle into whose liquid steel contents the electrodes are inserted. The refining facility 103 thus operates between two stations, the ladle positions 99 and 101 constituting the pair of available refining operating positions or stations. During the metallurgical refining process, argon gas may be bubbled through the molten steel, and final trim alloys may be added in conformity with conventional metallurgical refining techniques. For simplification, alloy additive chutes, etc. conventionally associated with such refining facility are not shown on the drawing.

When the tundish (not shown) is ready to accept molten steel from a ladle for feeding the caster 14, the electrodes 109 are removed from the ladle, which can then be positioned over the caster 14 in one of the pouring positions 18 and tapped to supply molten steel to the tundish in conformity with conventional practice. At that time the electrode support arm 105 is swung out of the way and over the other of the two ladle stations 99, 101 at the refining facility 103, following which refining of the contents of that other ladle occurs. The AC electrodes are thus toggled between the two ladle positions 99, 101 as required for the series of refining operations.

Alternatively, the ladles after completion of the refining process may be set aside in stacking area 40 or elsewhere for pouring at a later time. During the holding period, they are kept covered and insulated to avoid excessive heat loss.

Note that the equipment layout as thus far described facilitates an orderly and convenient performance of the required series of operations within the melt shop. Steel progresses from scrap to refined molten steel ready for casting generally longitudinally from scrap input to the primary melting furnaces, thence to the refining facility stations, and thence to the caster. Longitudinal dimensions can be selected to be a minimum. All equipment can be served by one or other of the overhead cranes 11, 13. The overlapping in the longitudinal sense of selected items of equipment can facilitate a compact layout. Such overlapping includes, in the exemplary layout illustrated, part of the ladle transfer trackway 79 with the preheat and stacking areas 40, 73, and with downstream scrap bucket trackway 24. A compact layout is also facilitated by the twinning of the furnace pairs 31 and 33 and by twinning the refining stations 99 and 101 in close proximity, with each twinned pair having, as a pair, generally longitudinal orientation. Further efficiency of layout is obtained by aligning the caster 14 in generally longitudinal alignment with the other major items of equipment within the melt shop.

It would be possible to provide each of the furnaces 31 and 33, and the two operating stations 99, 101 of refining facility 103, with a discrete electrode or set of electrodes so that toggling of electrodes would not be required. This could be more convenient for some purposes, and would (if a booster power supply were also made available) permit higher primary melt furnace output to meet peak caster demands. However, it would add at least several million dollars to the capital cost of the installation. Equally, it might conceivably be possible to provide more than two operating stations per electrode or per electrode set, although this possibility appears unlikely to be attractive.

If desired, an optional vacuum degasser station 42 may be provided for degassing of ladles of molten steel prior to casting.

Because the primary melting furnaces 31, 35 require significantly more time to melt enough steel to fill one of the ladles than the refining facility 103 takes to refine the contents of a ladle, it follows that the throughput possible through the refining facility is significantly higher than the output of the primary melting furnaces. One way to balance the two would be to double the number of primary melting furnaces so that a continuing supply of molten steel could be provided by the primary melting furnaces to the AC refining facility. This solution to the problem, however, would double the capital expenditure for the primary melting furnaces, thereby significantly increasing the cost of manufacture of a ton of steel, and also increasing the peak electrical load required, which would significantly increase energy costs. Further, during production of narrower widths of cast slabs, there would be unacceptable overcapacity.

According to the present invention, the imbalance between the AC throughput capacity and the primary melt output capacity is obtained by suitably sequencing the series of melts ("heats") so that a continuing supply of at least about 8 (if needed) and as many as approximately 16 heats (if needed) can be prepared and poured into the caster for continuous casting purposes.

To this end, it is proposed according to the invention to provide in inventory a number of ladles of steel containing molten metal (preferably superheated) that are set aside before refining or set aside after refining and before pouring into the tundish, or both, and that supplying refined molten steel to the caster is delayed for the initial melting time following starting melting the steel, and for an initial refining time following starting refining the molten steel, until a sufficient number of such heated ladles of molten steel, a sufficient number of which have been refined, have been prepared such that an adequate supply of steel can be provided to the caster (via the tundish) during a supply time for an adequately long continuous casting process cycle. Expressed in terms of amount of steel instead of time, casting is delayed until a gross inventory of molten steel is prepared. This gross inventory of molten steel is stored in a corresponding gross inventory of ladles of molten steel. Of this gross inventory of molten steel, some has been refined. Specifically, the gross inventory of molten steel includes an inventory of refined molten steel. The inventory of refined molten steel is stored in a corresponding inventory of ladles of refined molten steel, which itself is contained in the corresponding gross inventory of ladles of molten steel. Ladles set aside may be further superheated and refined or poured two or more hours later.

The preferred scheduling of the use of the furnaces and of heats to be stacked in inventory will depend upon a number of factors, including the slab size to be cast, the total number of heats required to meet a customer's order, the ladle size, the transformer capacity, the maximum permitted temperature increase per minute in the active refining facility station, and possibly other parameters.

The melt shop designer will take into account the expected types of order that most customers will place, including the end product type and quantity, and will take into account the expected annual production of the steel mill. The melt shop should be designed to meet the most usual range of orders, and must be sufficiently flexible that the normal range of orders can be reasonably accommodated. The melt shop designer must also take into account the caster output speed in inches per minute and must design the melt shop with this value in mind.

TIME CHART

In order for there to be enough molten refined steel throughout the casting cycle to continuously supply the caster, a required minimum quantity of molten steel must be prepared before casting starts, and a required minimum portion of this quantity of molten steel must also be refined. However, in order to keep the amount of molten steel in inventory as low as possible, the quantity of molten steel should preferably be in the neighborhood of the minimum quantity required. To determine the minimum quantity of molten steel, and the minimum portion of this minimum quantity that must be refined, the relative lengths of time required to melt, refine and supply to the caster the quantity of steel required for a continuous production run should be compared, taking into account the extent to which these time periods are disjoint. To simplify this comparison a number of terms are defined and their relation to one another is illustrated in a time chart. This time chart is then used to determine the constraints the scheduling method must satisfy if casting is to be continuous.

Definitions

Primary melting time: the time period over which the quantity of steel required for a continuous production run is melted.

Refining time: the time period over which the quantity of molten steel required for a continuous production run is refined.

Supply time: the time period over which the quantity of refined molten steel required for a continuous production run is supplied to the caster.

Initial melting time (IMT): the length of time during which melting occurs but steel is not being supplied to the caster, which is the amount of time that the primary melting time leads the supply time.

Initial refining time (IRT): the length of time during which refining occurs but steel is not being supplied to the caster, which is the amount of time that the minimum refining time leads the supply time.

Trailing Supply Time (TST): the length of time during which melting has ceased but steel is still being supplied to the caster, which is the amount of time that the supply time trails the primary melting time.

Parameters

N is the number of heats.

Let x be the time required to melt one ladle of steel.

Let y be the time required to refine one ladle of steel.

Let z be the time required to supply one ladle of steel. Then

I. Primary melting time=Nx (assuming melting is continuous)
II. Refining time=Ny (assuming refining is continuous)
III. Supply Time=Nz (assuming supplying is continuous)

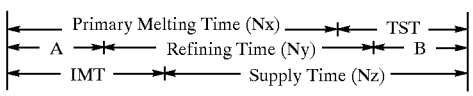

The following analysis assumes that the refining time will always be less than the primary melting time. This is generally an accurate assumption; however, the analysis can readily be adapted to address situations where the refining time is not less than the primary melting time.

Constraints to be met in order for the caster to be continuously supplied with refined molten steel IV. IMT$\geq$x+y (At least one ladle of steel must be melted and refined before casting can start.)

V. TST$\geq$y+z (Refining the last ladle of steel and supplying it to the caster must occur after the primary melting time has ended.)

VI. A$\geq$x (At least one ladle of steel must be melted before refining can start.)

IRT$\geq$Y (At least one ladle of steel must be refined before casting can start.)

VII. B$\geq$z (Supplying the last ladle of steel to the caster must occur after the refining time has ended.)

All of those constraints can now be expressed in terms of IMT and IRT. When expressed in terms of IMT and IRT, the constraints can, in turn, be used to determine how much molten steel and refined molten steel must be prepared prior to commencing casting. As there are two constraints regarding each of IMT and IRT, two minimal values for each will be determined by the constraints. Each of IMT and IRT will be selected to be greater than the higher of these two minimal values, so that both constraints are satisfied.

Constraints for Initial Melting Time (IMT)

The constraint TST$\geq$y+z must be expressed in terms of IMT in order to be useful in determining how much of an inventory of molten steel is required.

From the time chart, it can be seen that IMT+Supply Time=Primary Melting Time+TST and IMT+Primary Melting Time=Supply Time+TST From the inequality TST$\geq$y+z, it follows that IMT$\geq$Primary Melting Time–Supply Time+y+z As Primary Melting Time=Nx, and Supply Time=Nz IMT$\geq$Nx–Nz+y+z IMT$\geq$(N–1)(x–z)+x+y [as (N–1)(x–z)+x+y=Nx–Nz+y+z]

This result can be obtained more intuitively as follows: IMT must be at least x+y as at least one ladle of steel must be melted and refined before casting can start. After this first ladle is melted, there remain N–1 ladles to be melted. Each of these ladles will take (x–z) longer to melt than to supply, when refined, to the caster—i.e the time required to melt the second ladle of steel will exceed the time required to supply the first ladle of refined molten steel to the caster by (x–z). Thus, it will take a time difference of (N–1)(x–z) longer to melt the trailing N–1 ladles then the time required for the leading N–1 ladles to be supplied to the caster. Accordingly, to ensure that the last ladle of refined molten steel is ready to supply to the caster when the caster is ready to receive it, the IMT must be increased by (N–1)(x–z)+y where the y represents the time required to refine the last ladle melted. However, this time is measured from the end of the time required to melt the first ladle as melting of the second ladle will commence while refining of the first ladle is proceeding. Therefore, IMT$\geq$(N–1)(x–z)+x+y Constraints for Initial Refining Time The constraint B$\geq$z must be expressed in terms of IRT in order to be useful in determining how much of an inventory of refined molten steel is required.

Initial Refining Time (IRT)=Initial Melting Time (IMT)–A Thus, A=IMT–IRT

From the time chart, it can be seen that A+Refining Time+B=IMT+Supply Time

As A=IMT–IRT

IMT–IRT+Refining Time+B=IMT+Supply Time, and

IRT=Refining Time–Supply Time +B

As B$\geq$z

IRT$\geq$Refining Time–Supply Time+z

This result can be obtained more intuitively as follows: The first ladle of molten steel must be refined before it is supplied to the caster. Therefore, the initial refining time must be at least y. Where y$\geq$z, then the time required to refine each ladle of steel will take (y–z) longer than the timer required to supply each ladle of refined molten steel to the caster i.e. it will take (y–z) longer to refine the second ladle of molten steel than to supply the first ladle of refined molten steel to the caster. Therefore, it will take (N–1)(y–z) longer to refine the trailing N–1 ladles than to supply the leading (N–1) ladles to the caster. Therefore, the refining time should lead the supply time by at least (N–1)(y–z)+y or the Refining Time–Supply Time+z.

DETERMINING INITIAL MELTING TIME AND INITIAL REFINING TIME

From these constraints, the initial melting time and initial refining time necessary to ensure there is sufficient refined molten steel for continuous casting can be determined. Where the primary melting time and the refining time are both less than the supply time, then the invention has no application as the only constraint governing the scheduling method is that there must be one ladle of refined molten steel before casting has commenced. Where either one or both of the primary melting time and the refining time exceed the supply time, the scheduling method of the application applies. All of these situations that arise depending on the relative lengths of the supply time and the primary melting time and refining time are considered below.

PRIMARY MELTING TIME V. SUPPLY TIME

VI. Primary melting time>supply time (x>z)

Where Primary melting time>supply time, select IMT=(N–1)(x–z)+x+y

Then, as (x–z)>0, it follows that (N–1)(x–z)>0 and both constraints are satisfied as IMT>x+y Accordingly, where the primary melting time>supply time, select IMT=(N−1)(x−z)+x+y or IMT=Primary Melting Time−Supply Time+time to refine and supply one ladle of molten steel.

VII. Primary melting time ≯ supply time (x ≯ z)

Where Primary melting time ≯ supply time, select IMT−x+y

Then as (N−1)(x−z) ≯ 0, both constraints are satisfied as IMT≧(N−1)(x−z)+x+y

Accordingly, where the primary melting time ≯ supply time, select IMT=x+y or IMT=time to melt and refine one ladle of steel

REFINING TIME V. SUPPLY TIME

VIII. Refining time ≯ Supply time (y>z)

Where Refining time>Supply time, select IRT=Refining Time−Supply Time+z

Then as IRT=Refining Time−Supply Time+z, and Refining time>Supply time, the constraint that IRT>z is automatically satisfied.

Accordingly, where Refining time>Supply time, select IMT=Refining Time−Supply Time+z, or IMT=Refining Time−Supply Time+time required to supply one ladle of refined molten steel.

IX. Refining time ≯ Supply time (y ≯ z)

Where y ≯ z, select IRT=y

Recall that Refining time=Ny and that Supply time=Nz, and, accordingly, that Refining Time−Supply Time+z=Ny−Nz+z=(N−1)(y−z)+y Note that as y ≯ z, (y−z) ≯ 0 and y>(N−1)(y−z)+y Then as IRT=y, IRT≧(N−1)(y−z)+y≧Refining Time−Supply Time+z Accordingly, where Refining time ≯ Supply time, select IRT=y, or IRT=the time required to refine one ladle of molten steel.

EXAMPLE

The mill manger has to work as best he can with the equipment available to him, and attempts to tailor resources to his order book demand so that the facility operates to the most economical advantage. On the other hand, before the mill is built, the mill designer attempts to guess at the kind of order book demand that will be economically attractive to the mill, and attempts to design the facility accordingly. To that end, the designer may try to step into the shoes of the mill manager, guessing what range of orders in what quantity the mill should reasonably expect to meet.

Suppose that the mill designer targets an annual production of 1 million tons of rolled steel to be sold as coiled strip or as flat plate, according to customer demand. Support further that the expected product widths range from about 48 inches to about 96 inches. Suppose further that typical orders are expected to be in the 1000- to 1500-ton range.

With the objective of meeting the foregoing steel mill requirements, the melt shop designer should devise a planning chart of the sort exemplified in Table 1, which shows representative melt shop scheduling and parameter values, assuming the use of 150-ton ladles and a continuous caster designed to produce 5" slabs at the rate of 75"/min., with a metallurgical length of about 42'.

Note that the specific numeric values in Table 1 are by way of example only, and should not be taken as limiting the scope of the invention.

Note also that the designer will take into account not merely the nominal time values or computations that are mentioned below, but will allow for a margin of error and provide a measure of overlap from heat to heat, so as to take into consideration at least some contingencies and delays. Typically about a 15-minute overlap from heat to heat is provided for continuous casting operations.

For simplicity, the above analysis has been based on the assumption that various parameters, such as the time required to melt, refine and cast a given quantity of steel, are known in advance and do not change. In fact, it will be appreciated by those skilled in manufacturing steel that none of these times are known precisely beforehand. Instead, these times are estimated, and these estimates may change frequently as more information is received from the melting furnaces, refining stations and caster over the production run. As these estimates change to better reflect their true values, the scheduling method of the invention takes into account the revisions to these estimates in determining the inventory amounts of molten steel and refined molten steel.

In particular, as more information is gained regarding the quality of the scrap and the speed of melting and refining as well as the caster demand, the estimates of the minimum primary melt time, the refining time and the supply time will also change. Specifically, the melting rate may be affected by any of the following factors on an ongoing basis:

1. The fact that the exact amount of scrap is not known beforehand, although it is estimated by the crane operator;
2. The fact that due to yield loss, the number of tons of molten steel received from the primary melting furnaces will vary;
3. The fact that the time required to melt the steel, as well as the amount of steel melted will be affected by the quality and characteristics of the scrap.

The following factors would affect the refining time on an ongoing basis:

1. Mechanical or testing delay problems, such as variations in the time required to test the alloy and get results;
2. The time required to remove sufficient sulphur;
3. The time required for argon stirring;
4. The amount and type of alloying elements that have to be added.

For the most part, the time variations at the refining stage are of lesser importance for typical melt shops, as these times are less than the melting times and, accordingly, are off the critical path. Nonetheless, the time to refine the last ladle of molten steel after melting is completed will lie on the critical path.

Casting speed will be affected by the following factors:
1. Unplanned temperature and quality problems;
2. Pouring difficulties;
3. Torch-cutting difficulties;
4. Casting speed error resulting from imperfections in the electronic equipment.

These lists of factors of factors are not intended to be exhaustive; other important factors will occur to those skilled in the art. Instead, these factors are listed to illustrate the dynamic character of the method of the present invention.

In addition to uncertainties arising from the above causes, it may be necessary to slow down the melting, refining and casting rates due to downstream occurrences such as a rush order or a slab of steel damaging a coiler furnace so that it cannot be used until repairs are made. Once the rates and times for melting, refining and casting have been revised in response to these changes, new delay times and inventory amounts can be calculated.

Working from Table 1, the melt shop designer might usefully list the slab sizes to be cast to meet various customer orders. In the first column of Table 1, a number of slab sizes are listed; in this example the sizes range from 48 inches to 96 inches. Knowing these dimensions, the caster tonnage demand per hour can be computed—this figure appears in the third column. The maximum order size that the designer wishes to accommodate is selected in this example to be approximately 1350 tons. Since a ladle contains 150 tons, such maximum order will require 9 heats (9 lades of molten steel) of continuous casting.

furnaces for an extended period so as to perform more extensive repair and maintenance work; this can be done when the smaller slab sizes are being produced. Note, however, that this 163-ton-per-hour rate using one primary melt furnace is available only by operating the furnace at the higher power level of 120 MVA.

With a 25 MVA power level available, the refining facility can produce a ladle of molten steel as quickly as every 20

NEW TABLE 1

MELT SHOP SCHEDULING AND PARAMETERS - 150 - TON HEATS

| SLAB SIZE | NUMBER IN SEQUENCE | CASTER DEMAND @ 75"/min | STACKED MOLTEN HEATS | STACKED REFINED HEATS | EAF tons/hr | TRANS- FORMER EAF | TRANS- FORMER LMF | PRIMARY TIME | REFINING TIME |
|---|---|---|---|---|---|---|---|---|---|
| 48" × 5" | 9 | 153 tons/hr | 1 | 1 | 1 @ 163 | 120 | 25 | 55 min | 50 min |
| 48" × 5" | 9 | 153 tons/hr | 1 | 1 | 2 @ 163 | 90 | 25 | 55 min | 50 min |
| 60" × 5" | 9 | 191 tons/hr | 3 | 1 | 1 @ 163 | 120 | 25 | 55 min | 39 min |
| 60" × 5" | 9 | 191 tons/hr | 3 | 1 | 2 @ 163 | 90 | 25 | 55 min | 39 min |
| 60" × 5" | 9 | 191 tons/hr | 4 | 1 | 2 @ 200 | 120 | 25 | 42 min | 32 min |
| 72" × 5" | 9 | 229 tons/hr | 4 | 1 | 1 @ 163 | 120 | 25 | 55 min | 32 min |
| 72" × 5" | 9 | 229 tons/hr | 3 | 1 | 2 @ 200 | 120 | 25 | 42 min | 32 min |
| 84" × 5" | 9 | 267 tons/hr | 5 | 1 | 1 @ 163 | 120 | 25 | 55 min | 32 min |
| 84" × 5" | 9 | 267 tons/hr | 4 | 1 | 2 @ 200 | 120 | 25 | 42 min | 32 min |
| 96" × 5" | 9 | 306 tons/hr | 5 | 2 | 2 @ 200 | 120 | 25 | 42 min | 32 min |
| 96" × 5" | 8 | 306 tons/hr | 4 | 2 | 2 @ 200 | 120 | 25 | 42 min | 32 min |
| 96" × 5" | 7 | 366 tons/hr | 4 | 2 | 2 @ 200 | 120 | 25 | 42 min | 32 min |

The electric arc furnace (primary melting furnace) may be able to operate at more than one power level. In this example, it is assumed that the transformer for the primary melt electric arc furnace can operate at 90 MVA or 120 MVA. It is usually not convenient to operate the ladle metallurgical facility at more than one power level, since excessive power applied to the ladle of molten steel will tend to erode the refractory lining of the ladle unacceptably above some specified applied power. In a 150-ton ladle, a maximum temperature increase of about 7° F. (about 4° C.) per minute, obtainable at an applied power of 25 MVA, is about the maximum rate of temperature increase that is acceptable without unacceptable erosion of refractory linings of the ladles.

Using the foregoing information, the melt shop designer can plan for each slab size, decide whether one or two primary melting furnaces will be required to operate, and at what power level they will operate. He will also compute the number of stacked heats required to be placed in inventory (preferably between the primary melt furnace and the refining facility—or, where the molten steel in the ladle has also been refined, between the refining facility and the caster) before casting can commence. Where only one stacked heat or one ladle of molten steel in inventory is required, the stacked heat can be immediately (without pause) supplied to the refining stations and from thence to the caster. Where only one stacked heat need be subjected to refining prior to commencing casting, the refined heat can proceed directly and without pause from the refining stations to the caster.

It can be seen from the top row of Table 1 that for the relatively small slab size 48 inches by 5 inches, only one of the primary melting furnaces need operate because the caster demand is only 153 tons per hour, and the primary melt furnace with 150-ton capacity can provide a ladle of molten steel in 55 minutes. It follows that the production rate of the primary melt furnace, viz 163 tons per hour, is in excess of the caster demand and, therefore, the second primary melt furnace need not operate. It is advantageous from time to time to be able to shut down one of the primary melting minutes, if required to do so. However, for most slab sizes, the refining facility would not have to meet that rate of production. It is sufficient if the rate of production of the refining facility be matched to the primary melting furnaces, but to give a margin of comfort, the refining facility could be operated to provide a finished ladle of molten steel in just slightly less time than the time required for the primary melt furnace to produce a ladle of steel. Assuming that the primary furnace can produce a 150-ton ladle of molten steel in 55 minutes, then at a reduced power consumption, the refining facility could be set to produce a finished ladle of molten steel in 50 minutes, giving a 5-minute comfort margin.

However, as discussed above, there is an advantage obtainable by preheating the charge in the idle one of the primary melting furnaces by means of the offgas directed from the active primary melting furnace there through. It is expected that this benefit would be sufficient that the transformed capacity to drive the primary melting furnaces could be reduced from 120 MVA to 90 MVA if this available preheating benefit is utilized. This premise underlies the figures in row 2 of Table 1. All parameters are identical to those in the first row, with the exception that the transformer capacity for the primary melting furnaces can be reduced (and electrical power consumption reduced accordingly) by reason of the preheating benefit, when both primary melting furnaces are operated.

At an increased slab size of 60 inches by 5 inches, the caster demand is 191 tons per hour. It is possible by operating both electric arc furnaces at the 120 MVA transformer capacity, using the preheating benefit, to reduce the time required to melt 150 tons of steel to 42 minutes, giving an output of 200 tons per hour from the primary melting furnaces. However, the mill designer has the option of operating at a lower power level, producing only 163 tons per hour. However, at an output of 163 tons per hours, the primary melting furnaces would fall short of the 191 tons per hour demanded by the caster. Consequently, if the 163-tons-per-hour output rate is chosen, it is necessary to produce stacked heats in inventory before casting can commence, in order to ensure a continuous supply of molten steel to the caster.

The three options for producing sufficient steel in the melt shop to generate 9 heats for the production of 60 inch by 5 inch slabs occupy the third, fourth and fifth rows of Table 1. In row 3, one primary melt furnace is shown as operating at the 120 MVA transformer capacity level, and producing 163 tons per hour. Because the caster demands 191 tons per hour, and since the 9 heats produce a total of 1350 tons, it follows that the caster must be provided with the 1350 tons of steel in a supply time of approximately 7 hours and 5 minutes. However, working at 163 tons per hour, the minimum primary melt time of the primary melt furnace, is 8.3 hours. Accordingly, the primary melting time exceeds the supply time and the initial melting time must be at least equal to Primary Melting Time—Supply Time+the time required to refine and supply one ladle of molten steel hours. The time required to refine one ladle of molten steel is 32 minutes or 0.533 hours, and the time require to supply one ladle of refined molten steel to the caster, given a caster demand of 191 tons/hr, is 0.785 hours. Thus, Initial Melting Time= (8.3−7.083+0.553+0.785) hours=2.535 hours. Over 2.535 hours, over 2 ladles of molten steel should be prepared by the primary melting furnaces. If one is computing integral numbers of ladles to be set aside in inventory, it follows that three ladles in inventory would have to be provided. However, casting could probably be commenced somewhat sooner than the completion of production of the third ladle to be placed in inventory.

As the refining time does not exceed the supply time in row 3, only one ladle of the three ladles of molten steel needs to be subjected to refining prior to starting casting.

Row 4 of Table 1 illustrates the point that the same rate of production as for row 3 can be obtained using two primary melting furnaces and preheating, but operating at a lower transformed power level of 90 MVA. Again, if one is working with integral numbers of ladles to be placed in inventory, one must provide three stacked heats prior to commencement of casting (or else commence casting somewhat sooner than the completion of production of the third ladle) for a full run of 9 heats. Of these three stacked heats, only one must be subjected to refining prior to starting casting.

Row 5 in Table 1 reveals that one needs only one stacked heat in inventory to make 60"×5" slab if one operates both primary melting furnaces at the higher 120 MVA transformer level of operation yielding 200 tons per hour with a melt time of 42 minutes per heat. This arc furnace output rate of 200 tons per hour is in excess of the 191 tons per hour demanded by the caster (Primary melting time<Supply time) and, consequently, only one stacked heat needs be set aside. This stacked heat should also be refined before casting starts. However, there is not much of a margin of error—the 200 tons/hour rate of production exceeds the 191 tons/hour caster demand by only a small percentage, and if there were any unexpected problems, it is possible that the caster demand could not be met. So by way of "insurance" the melt shop operator might prefer to operate the furnaces at a lower rate of production, and to provide two stacked heats in inventory.

Moving to 72-inch-by-5-inch slab sizes, it can be seen from row 6 of Table 1 that if only one primary melt furnace is operating at the 120 MVA rated capacity, it would be necessary to stack four heats in inventory before casting commences. The melt shop operator might well prefer not to try to produce 72"×5" slabs using only one primary melt furnace, and instead would operate two primary melting furnaces. If these are both operated at the 120 MVA transformer power capacity level, then, as reflected in row 7 of Table 1, three stacked heats would be required (assuming that we are working with integral numbers of stacked heats).

As the refining time does not exceed the supply time in both rows 6 and 7, only one ladle of the five or three ladles of molten steel needs to be subjected to refining prior to starting casting.

Continuing to increase the size of casting and working with an 84"×5" casting, similar computations indicate (row 8 of Table 1) that one furnace operating at the 120 MVA level would require 5 stacked heats, of which one ladle must be subjected to refining prior to commencing casting. Quite possibly 5 heats represents about the upper limit of the number of stacked heats that could be tolerated—the exact number will depend upon the available inventory storage area, upon the rate of cooling of the steel in a ladle, and possibly other factors. Alternatively, as shown in row 9, the melt shop operator could work with two alternately active furnaces. Operating at the 120 MVA power level and producing 200 tons per hour, the primary melting furnaces should produce an inventory of 4 heats prior to casting (assuming that we continue to work with integral numbers of heats). One of these four ladles must be subjected to refining prior to commencing casting.

At the 96"×5" slab size, the caster demand increases to 306 tons per hour, which is well in excess of the peak tonnage per hour that the primary melting furnaces are able to produce (assuming that only one furnace at a time is supplied with power using the toggle principle discussed above) and is also in excess of the peak tonnage per hour that the refining stations are able to produce. To produce as many as 9 heats with a caster demand of 306 tons per hour, 5 stacked heats in inventory would have to be provided. To produce 8 or 7 heats, as shown in rows 11 and 12 respectively 4 stacked heats in inventory would have to be provided.

As the refining time exceeds the supply time in rows 10 to 12, the number of stacked heats that should be subjected to refining prior to starting casting is the number of ladles required to contain the quantity of steel that can be refined over the initial refining time, where the initial refining time is determined by the subtracting the supply time from the sum of the refining time and the time required to supply one ladle of refined molten steel to the caster. The supply time in row 10 is 4.412 hours while the time required to supply one ladle of refined molten steam to the caster is one ninth of the supply time or 0.490 hours. The refining time is 4.800 hours; accordingly, the initial refining time is 0.878 hours, which is more than enough time to refine one ladle of molten steel, although insufficient time to refine two ladles of molten steel. Accordingly, assuming that we are working with integral numbers of refined stacked heats, two of the five stacked heats should be refined.

As indicated in rows 11 and 12, two of the 4 stacked heats should be subjected to refining prior to starting casting. This result is determined by applying the same function applied in the above paragraph with respect to paragraph 10.

If the time to refine one ladle of molten steel is reduced from 32 minutes to the minimum 20 minute refining time, then the supply time will exceed the refining time for rows 10 to 12 and only one of the stacked molten heats in each case need be refined.

If the melt shop designer decided that this last figure is inadequate (i.e. that a seven heat cycle is not enough), then the melt shop designer would probably decide that 96 inch by 5 inch slabs would be made using two successive caster runs, if tonnage in the 1500-ton range were required to fulfil a customer's order. Otherwise, the melt shop designer would probably elect to increase the capacity of the melt shop, quite probably by increasing the 150-ton ladle size to 200 tons, although increased power levels could also be considered as an option. If much higher melt shop production were required to meet caster demand, then the entire melt shop could be doubled in size.

A number of items of apparatus normally found in a melt shop and a number of the associated procedures have not been described in this specification because they are conventional in character and do not relate directly to any of the inventive subject matter described and claimed herein. For example, the melt shop would be provided with a ladle dump station, slag addition and disposal means, transformers and associated electric power supply equipment, testing stations, control rooms, lances for injecting oxygen into the melt, etc. in accordance with conventional melt shop practice.

The melt shop layout shown could be roughly doubled to obtained double production.

Variations within the scope of the invention will readily occur to those skilled in the art.

What is claimed is:

1. In a method of producing a quantity of steel for a continuous production run of a continuous caster receiving refined molten steel from a refining facility that in turn receives molten steel from a primary melt facility, wherein the rate of consumption of refined molten steel by the caster exceeds the rate of production of refined molten steel, and wherein the quantity of refined molten steel is supplied to a caster over a supply time, the supply time commencing at a supply starting point;

the quantity of steel is melted over a total melt time comprising an initial melt time and a later melt time, the initial melt time preceding the supply starting point and the later melt time following the supply starting point;

the quantity of molten steel is refined over a total refining time comprising an initial refining time and a later refining time, the initial refining time commencing at a refining starting point after commencement of the initial melt time when molten steel is available for refining and ending at the supply starting point, the later refining time commencing at the supply starting point;

the improvement comprising:

(a) determining a plurality of independent control variables including
   (i) a total melt time estimate, the total melt time estimate being an estimate of the length of the total melt time required for the production run,
   (ii) a total refining time estimate, the total refining time estimate being an estimate of the length of the total refining time required for the production run, and
   (iii) a supply time estimate, the supply time estimate being an estimate of the length of the supply time required for the production run, said plurality of independent control variables being revisable at selected monitoring times during the initial melt time based on the monitored values of at least one selected monitored parameter representing monitoring times;

(b) generating an initial melt time estimate based on said plurality of control variables, the initial melt time estimate being an estimate of a length of the initial melt time sufficient for the caster to be continually supplied throughout the supply time with steel melted during the total melt time;

(c) commencing melting steel;

(d) revising said initial melt time estimate during the initial melt time in response to revisions made at said selected monitoring times to said supply time estimate, said primary melt time estimate and said total refining time estimate;

(e) generating an initial refining time estimate based on said plurality of control variables, the initial refining time estimate being an estimate of a length of the initial refining time sufficient for the caster to be continually supplied throughout the supply time with molten steel refined during the total refining time;

(f) commencing refining at the refining starting point after step (c) has started and sufficient molten steel is available for refining;

(g) revising said initial refining time estimate during the initial refining time in response to revisions made at said selected monitoring times to said supply time estimate, said primary melt time estimate and said total refining time estimate;

(h) commencing casting at an earliest casting starting point when both
   (i) said initial melting time estimate is less than the length of time elapsed since commencement of the initial melt time, and
   (ii) said initial refining time estimate is less than the length of time spent refining since the refining starting point.

2. The method of claim 1, wherein the total melt time exceeds the total refining time.

3. The method of claim 2, wherein step (b) comprises the steps of (i) initially estimating a marginal refining time estimate to be the length of time required to refine a ladle of molten steel;

(ii) revising said marginal refining time estimate from time to time during the initial melt time based on the monitored value of said at least one selected monitored parameter representing selected steel mill conditions, as monitored at said selected monitoring times;

(iii) initially estimating a marginal supply time estimate, to be the length of time required to supply a ladle of refined molten steel to the caster;

(iv) revising said marginal supply time estimate from time to time during the initial melting time based on the monitored value of said at least one selected monitored parameter representing selected steel mill conditions, as monitored at said selected monitoring times;

(v) calculating said initial melt time estimate to be at least the length of time obtained by
   adding said total melt time estimate, said marginal refining time estimate and said marginal supply time estimate, and
   subtracting said supply time estimate, (vi) operating the primary melt facility for at least said initial melt time estimate prior to commencing casting, thereby preparing a gross inventory of molten steel, said gross inventory of molten steel being at least the amount of steel that can be melted by the primary melting furnaces within said initial melt time estimate, and including all molten steel refined before the supply starting point;

(vii) storing said gross inventory of molten steel by filling ladles in sequence to provide a corresponding gross inventory of ladles of molten steel prior to casting, wherein the number of ladles of molten steel in said corresponding gross inventory is selected to be sufficient to contain said gross inventory of molten steel, and refining at least one ladle of molten steel in said corresponding gross inventory; and, wherein, when the total refining time estimate exceeds the supply time estimate, step (e) comprises the steps of (i) initially estimating a marginal supply time estimate to be the time required to supply a ladle of refined molten steel to the caster;

(ii) revising said marginal supply time estimate from time to time during the initial melt time based on the monitored value of said at least one selected monitored parameter representing selected steel mill conditions, as monitored at said selected monitoring times;

(iii) calculating said initial refining time estimate to be at least the length of time obtained by adding said total refining time estimate and said marginal supply time estimate, and subtracting said supply time estimate; and, (iv) operating the refining facility for at least said initial refining time estimate prior to casting commencing, thereby preparing an inventory of refined molten steel, said inventory of refined molten steel being the amount of molten steel in said gross inventory of molten steel that can be refined during said initial refining time estimate, and being contained in a corresponding inventory of ladles of refined molten steel.

4. The method of claim 3, wherein when the primary melt facility contains heated steel that has been heated, but not yet melted, by the primary melt facility after completion of step (h), the casting starting point is delayed following said earliest casting starting point for a time sufficient to permit melting of the heated steel.

5. The method of claim 2 wherein the amount of steel is melted in a primary melt furnace and refined in a metallurgical refining facility, and is transported from the metallurgical refining facility to the caster in a series of selected substantially uniform discrete quantities of a size selected to be individually efficiently refined and supplied to the caster, step (b) comprises the steps of (i) initially estimating a marginal refining time estimate to be a time sufficient for one of said uniform discrete quantities of steel to be refined;

(ii) revising said marginal refining time estimate from time to time during the initial melting time based on said at least one selected monitored parameter representing selected steel mill conditions at said selected monitoring times;

(iii) initially estimating a marginal supply time estimate estimated to be a time sufficient for one of said uniform discrete quantities of steel to be supplied to the caster;

(iv) revising said marginal supply time estimate from time to time during the initial melting time based on said at least one selected monitored parameter representing selected steel mill conditions at said selected monitoring times;

(v) selecting an initial melting time estimate to be at least the length of time obtained by adding said total melt time estimate, said marginal refining time estimate and said marginal supply time estimate, and subtracting said supply time estimate, (ii) operating the primary melt facility over the initial melting time estimate, thereby preparing said gross inventory of molten steel over said initial melting time estimate; and wherein step (e) comprises the steps of (i) initially estimating a marginal supply time estimate, said marginal supply time estimate being estimated to be a time sufficient for one of said uniform discrete quantities of steel to be supplied to the caster;

(ii) revising said marginal supply time estimate from time to time during the initial melting time based on said at least one selected monitored parameter representing selected steel mill conditions at said selected monitoring times;

(iii) selecting an initial refining time estimate to be at least the length of time obtained by adding said total refining time estimate and said marginal supply time estimate, and subtracting said supply time estimate; and, (iv) operating the refining stations over said initial refining time estimate, thereby preparing said constituent inventory of refined molten steel over said initial refining time estimate and prior to casting, said constituent inventory of refined molten steel being contained in said gross inventory of molten steel.

6. A method of melting, refining and casting steel in a melt shop provided with a pair of primary melting furnaces, and a refining facility having at least a pair of operating stations wherein energy is supplied alternatively to the two primary melting furnaces, energy is selectably supplied to a selected one of the refining facility stations, and ladles of molten steel produced by the primary melting furnaces are transferred each to a selected one of the refining facility stations for refining before the ladle is emptied into a caster for use in a continuous casting process, the method comprising (a) producing a molten inventory of at least one ladle containing molten steel before refining commences, and thereafter supplying the refining facility stations with a sequence of ladles of molten steel on a continuing basis using both ladles freshly prepared by the primary melting furnaces and at least one ladle of molten steel in said molten inventory until such time as said molten inventory is depleted and the production of fresh ladles of molten steel has been temporarily exhausted; and (b) producing a refined molten inventory of at least one ladle containing refined molten steel before casting commences, and thereafter supplying the caster with a sequence of ladles of refined molten steel on a continuing basis using both ladles freshly prepared by the refining facility stations and at least one ladle of refined molten steel in said refined inventory until such time as said refined inventory is depleted and the production of fresh ladles of refined steel has been temporarily exhausted.

7. The method of claim 6, comprising energizing no more than one of said primary melting furnaces and no more than one charged ladle in the refining facility at any given time.

8. A method of claim 7, comprising toggling a first single electrical melting device between the two primary melting furnaces and toggling a second single electrical melting device between the operating stations at the refining facility and cycling the energized station of each set of melting devices in accordance with a selected toggling.

9. The method of claim 2 wherein said at least one selected monitored parameter representing selected steel mill conditions at said selected monitoring times includes (a) determining a melting rate estimate to be the amount of molten steel obtained divided by the time elapsed since melting commenced;

(b) determining a refining rate estimate to be the amount of refined molten steel divided by the time spent refining molten steel since refining commenced;

(c) determining a casting rate estimate to be the amount of refined molten steel supplied to the caster since casting commenced for the production run, divided by the time elapsed since casting commenced.

10. The method of claim 9, wherein (a) the total melt time estimate is recalculated whenever new molten steel is obtained by dividing the amount of steel by said current melting rate estimate;

(b) the total refining time estimate is recalculated whenever new refined molten steel is obtained by dividing the amount of steel by said current refining rate estimate; and, (c) the supply time estimate is recalculated whenever refined molten steel is supplied to the caster by dividing the target amount of steel by said current supply rate estimate.

* * * * *

UNITED STATES PATENT AND TRADEMARK OFFICE
CERTIFICATE OF CORRECTION

PATENT NO. : 5,902,371
DATED : 11 May 1999
INVENTOR(S) : William R. Frank

It is certified that error appears in the above-identified patent and that said Letters Patent is hereby corrected as shown below:

Abstract, line 5, change "are transferred the ladle" to --are transferred to the ladle--.

Col. 4, line 44, change "continue to the molten" to --continue to be molten--

Col. 4, line 60, change "possibly only on ladle" to --possibly only one ladle--

Col. 7, line 11, change "refining and ladles" to --refining and ladle--

Col. 8, line 26, change "two in numbers" to --two in number--

Col. 8, line 62, change "(typical about 1/5th)" to --(typically about 1/5th)--

Col. 9, line 26, change "(generally indicted as" to --(generally indicated as--

Col. 10, line 40, change "and dust 59" to --and duct 59--

Col. 11, line 5, change "to the furnace," to --to the furnaces,--

Col. 11, line 35, change "To so extent," to --To some extent,--

Col. 12, line 5, change "93. Alloy" to --93. Alloys--

Col. 12, line 11, change "once a ladle" to --Once a ladle--

Col. 15, line 56, change "and IMT + Primary" to --and IMT = Primary--

Col. 16, line 7, change "ladles then the time" to --ladles than the time--.
           lines 63,5,15, and 45
Col. 16 and Col. 17, change the roman numerals "VI", "VII", "VIII", and "IX" to --VIII--, --IX--, --X--, and --XI--, respectively.

UNITED STATES PATENT AND TRADEMARK OFFICE
CERTIFICATE OF CORRECTION

PATENT NO. : 5,902,371
DATED : 11 May 1999
INVENTOR(S) : William R. Frank

It is certified that error appears in the above-identified patent and that said Letters Patent is hereby corrected as shown below:

Col. 17, line 6, change "select IMT -" to --select IMT =--

Col. 17, line 15, change "time ≯ Supply" to --time > Supply--

Col. 17, line 51, change "demand. Support" to --demand. Suppose--

Col. 18, line 52, change "These lists of factors of factors are" to --These lists of factors are--.

Col. 20, lines 46-7, change "the trans-formed" to --the trans-former--

Col. 21, line 20, change "time require to supply" to --time required to supply--.

Col. 21, line 37, change "transformed power" to --transformer power--

UNITED STATES PATENT AND TRADEMARK OFFICE
CERTIFICATE OF CORRECTION

PATENT NO. : 5,902,371
DATED : 11 May 1999
INVENTOR(S) : William R. Frank

It is certified that error appears in the above-identified patent and that said Letters Patent is hereby corrected as shown below:

Col. 21, line 46, change "to make 60"x5" slab" to --to make 60"x5" slabs--.

Col. 22, line 7, change "of the five or three ladles" to --of the four or three ladles--.

Col. 22, line 44, change "by the subtracting the supply" to --by subtracting the supply --.

Col. 22, line 59, change "to paragraph 10." to --to row 10.--.

Col. 23, line 63, change "parameter representing monitoring times" to --parameter representing selected steel mill conditions existing at said selected monitoring times--.

Col. 25, line 66, change "estimate, (ii)" to -- estimate; and vi) --.

Signed and Sealed this

Fourth Day of January, 2000

Attest:

*Attesting Officer*

*Acting Commissioner of Patents and Trademarks*